Figure 1:
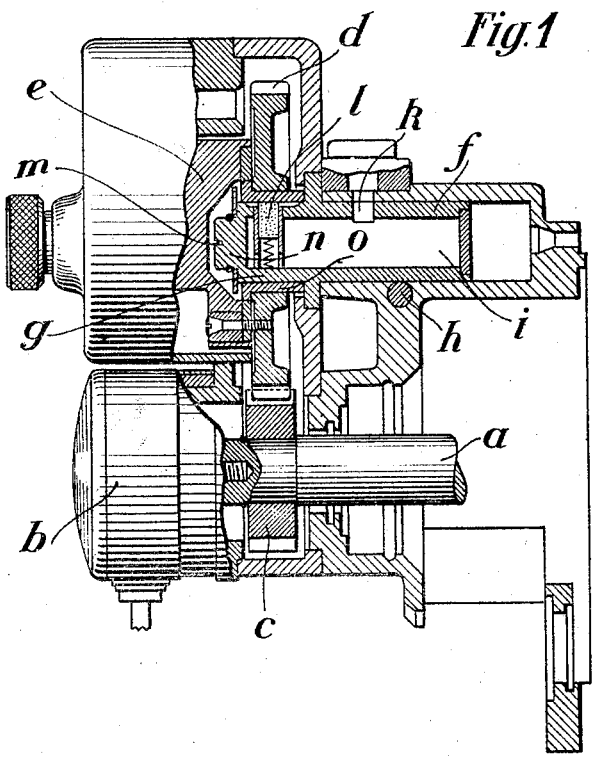

Aug. 18, 1925.

F. MÜNZ 1,549,845

BEARING ARRANGEMENT FOT TOOTHED WHEELS

Filed May 12, 1924

Inventor
F. Münz
By Marks & Clerk
Attys

Patented Aug. 18, 1925.

1,549,845

UNITED STATES PATENT OFFICE.

FRIEDRICH MÜNZ, OF STUTTGART, GERMANY, ASSIGNOR TO LUMA-WERKE A. G., OF ZURICH, SWITZERLAND.

BEARING ARRANGEMENT FOR TOOTHED WHEELS.

Application filed May 12, 1924. Serial No. 712,875.

*To all whom it may concern:*

Be it known that I, FRIEDRICH MÜNZ, citizen of Germany, residing at Stuttgart, Germany, have invented certain new and useful Improvements in Bearing Arrangements for Toothed Wheels, of which the following is a specification.

This invention relates to bearing arrangements for toothed wheels and its object is to provide an arrangement of this kind by which the distance between toothed wheels that are in mesh with each other can be regulated.

The regulation of the distance between pivots of toothed wheels is desirable when noiseless running is to be effected. This can be accomplished by causing the teeth of the wheels to enter more or less into engagement with each other by placing the axis of the wheels nearer to each other or farther apart.

General arrangements of this kind are known and have been proposed for electrical machines, particularly magneto ignition apparatus. The known arrangements however are complicated and require considerable space.

The novel arrangement according to the present invention for effecting alterations of the distance between the axis of two toothed or cog wheels, particularly the wheels for transferring motion from the interrupter to the distributor in electrical machines, consists in mounting one of the wheels on a bearing pin that is arranged eccentrically to the axis of a bolt with which it is united. The bolt is mounted so that it can be turned with respect to the second wheel with which the wheel mounted on the pin of the bolt engages. The eccentric pin and the bolt with which it is united are preferably hollow, the hollow space serving as a lubricant container. The bolt has a lubricant inlet and the pin a lubricant outlet. A further feature of the invention consists in providing the pin with a device by which the bolt can be easily turned in its hole. When the distance between the cog wheels has been adjusted by turning the bolt the latter is fixed so as to be immovable in its hole.

The invention is illustrated in the drawing in which—

Fig. 1 is a side view, partly in section of an illuminating dynamo, while

Figure 2:
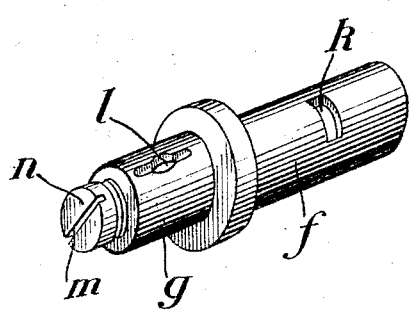

Fig. 2 is a perspective view of the hollow bolt with the united pin on which the one toothed wheel revolves. Mounted on the shaft $a$ of the lighting machine is an interrupter enclosed in a cap $b$ and also a toothed wheel $c$ that meshes with the toothed wheel $d$ of the distributer $e$. In accordance with the invention the toothed wheel $d$ is mounted on a pin $g$, which is eccentric to the axis of a bolt $f$. The bolt $f$ can be turned in a hole in the frame and fixed so as to be immovable therein as by a fixing screw $h$. The bolt $f$ and pin $g$ are preferably hollow so as to form a lubricant chamber $i$. The bolt has a lubricant inlet $k$ and the pin a lubricant outlet $l$.

To change the distance between the axes of the toothed wheels $c$ and $d$ the eccentric pin $g$ is moved away from or towards the shaft $a$ by turning the bolt $f$. The turning of the bolt can be effected conveniently by means of an instrument inserted into the slot $m$ of the head $n$ united with the pin $g$. The head $n$ for turning the bolt may of course have any other preferred shape.

The toothed wheel $d$ may be mounted directly on the pin $g$ or, as shown in Fig. 1, a bushing $o$ may be interposed between the pin and the inner circumference of the wheel in order to increase the bearing surface.

Although the novel bearing arrangement is described in connection with an electrical machine, it may of course be employed wherever it is desirable to change the distance between the axis of two toothed wheels.

I claim:—

1. A bearing arrangement for toothed wheels comprising a frame provided with a hole, a hollow bolt revolubly mounted in the hole, a hollow pin united with said bolt and having its axis eccentric with respect to the axis of the bolt, means for fixing the bolt in said hole, a toothed wheel revoluble on said pin, and a second toothed wheel in mesh with the first toothed wheel, said bolt and pin being hollow and serving as lubricant containers.

2. A bearing arrangement for toothed wheels comprising a frame provided with a hole, a hollow bolt revoluble in said hole and provided with a lubricant inlet, a hollow pin with a lubricant outlet united with said bolt, the axis of the pin being eccentric with respect to the axis of the bolt, means for fixing the bolt in said hole, a toothed wheel revoluble on said pin, and a second toothed wheel in mesh with the first toothed wheel.

3. A bearing arrangement for toothed wheels comprising a frame provided with a hole, a bolt revolubly mounted in said hole, a pin united with said bolt having its axis eccentric with respect to the axis of the bolt, means for fixing the bolt in said hole, a toothed wheel revoluble on said pin, a second toothed wheel in mesh with the first toothed wheel, and a member for turning said bolt in its hole.

4. A bearing arrangement for toothed wheels comprising a frame provided with a hole, a hollow bolt revolubly mounted in said hole, a hollow pin united with said bolt having its axis eccentric with respect to the axis of the bolt, means for fixing the bolt in said hole, a toothed wheel revoluble on said pin, a second toothed wheel in mesh with the first toothed wheel, the hollow bolt and hollow pin serving as lubricant containers, and a member for turning said bolt in its hole.

5. A bearing arrangement for toothed wheels comprising a frame provided with a hole, a hollow bolt revolubly mounted in said hole and provided with a lubricant inlet, a hollow pin with a lubricant outlet united with said bolt, the axis of the pin being eccentric with respect to the axis of the bolt, means for fixing the bolt in said hole, a toothed wheel revoluble on said pin, a second toothed wheel in mesh with the first toothed wheel, and a member for turning said bolt in its hole.

6. A bearing arrangement for toothed wheels comprising a frame provided with a hole, a bolt revolubly mounted in said hole, a pin united with said bolt and having its axis arranged eccentrically with respect to the axis of the bolt, means for fixing the bolt in said hole, a toothed wheel revoluble on said pin, a second toothed wheel in mesh with the first toothed wheel, and a member formed on said pin for turning said bolt in its hole.

7. A bearing arrangement for toothed wheels comprising a frame provided with a bolt revolubly mounted in the hole, a pin united with said bolt and having its axis arranged eccentrically with respect to the axis of the bolt, means for fixing the bolt in said hole, a toothed wheel revoluble on said pin, a second toothed wheel in mesh with the first toothed wheel, and a slotted head on said pin for turning said bolt in its hole.

8. A bearing arrangement for toothed wheels comprising a frame provided with a hole, a hollow bolt revolubly mounted in said hole, a hollow pin united with said bolt whose axis is eccentric to the axis of the bolt, means for fixing the bolt in said hole, a toothed wheel revoluble on said pin, a second toothed wheel in mesh with the first toothed wheel, said bolt and pin containing a lubricant, and a slotted head on said pin for turning said bolt in its hole.

9. A bearing arrangement for toothed wheels comprising a frame provided with a hole, a hollow bolt revolubly mounted in the hole and provided with a lubricant inlet, a hollow pin with a lubricant outlet united with said bolt, the axis of the pin being eccentric with respect to the axis of the bolt, means for fixing the bolt in said hole, a toothed wheel revoluble on said pin, a second toothed wheel in mesh with the first toothed wheel, and a slotted head on said pin for turning said bolt in its hole.

In testimony whereof I affix my signature.

FRIEDRICH MÜNZ.